United States Patent [19]

Hirt

[11] Patent Number: 4,652,291

[45] Date of Patent: Mar. 24, 1987

[54] PARISON TRANSFERRING MECHANISM

[75] Inventor: Walter Hirt, Buelach, Switzerland

[73] Assignee: Emhart Industries, Inc., Farmington, Conn.

[21] Appl. No.: 790,552

[22] Filed: Oct. 23, 1985

[30] Foreign Application Priority Data

Oct. 27, 1984 [GB] United Kingdom ............... 8427233

[51] Int. Cl.[4] ............................................. C03B 9/40
[52] U.S. Cl. ........................................ 65/68; 65/167; 65/173; 65/235; 65/241
[58] Field of Search .................. 65/68, 167, 173, 235, 65/241, 260

[56] References Cited

U.S. PATENT DOCUMENTS 2,084,285  6/1937  Wadman ............................. 65/173

Primary Examiner—Arthur Kellogg
Attorney, Agent, or Firm—H. Samuel Kieser

[57] ABSTRACT

Neck ring half (18,20) supporting arms (14,16) are mounted on carriers (10,12) therefor, in a parison transferring mechanism of a glassware manufacturing machine, by providing a stop (40) on each carrier at a predetermined height (x) relative to an axis (24) about which the carriers turn to move the neck ring halves and hence the parisons. As an arm slides into a mounting therefor on the carrier, a heightwise adjustable stop (44) on the arm contacts the stop (40) and thereby determines the height of the arm. Adjustment of the stop (44) on the arm can be carried out away from the machine so that machine down-time can be reduced.

6 Claims, 3 Drawing Figures

Fig_1

Fig_2

PARISON TRANSFERRING MECHANISM

BACKGROUND OF THE INVENTION

This invention is concerned with a parison transferring mechanism for a glassware manufacturing machine. In a glassware manufacturing machine of the individual section type, parisons are formed from gobs of molten glass at parison forming stations of the sections of the machine by either a blowing or a pressing operation. The parisons are then removed from the parison forming stations by parison transferring mechanisms (also called "invert mechanisms" as the parisons are inverted as they are transferred) and are delivered to finishing stations where the parisons are formed into articles of glassware by a blowing operation. The parison transferring mechanism of a conventional machine comprises two neck ring carriers each of which provides a mounting for an arm which supports a neck ring half. The mounting comprises a T-shapd projection which fits into a complementarily-shaped open-ended slot in the arm. The carriers are movable towards one another to bring the neck ring halves into parison-gripping engagement or apart to separate the neck ring halves to release a parison. The carriers are also turnable back and forth about a common horizontal axis to move the neck ring halves between a parison-gripping position at a parison forming station and a parison-releasing position at a finishing station.

The carriers are turned through approximately 180° in this movement, inverting the parisons.

The mounting for each arm is arranged so that the arm projects away from the carrier in a plane normal to the horizontal axis, when the T-shaped projection is received in the slot in the arm. The arm can be moved along the T-shaped projection so that, when the carrier is turned into an orientation such that the arm projects horizontally (as it does at the parison-gripping position and at the parison-releasing position), the height of the arm relative to the axis can be adjusted. The height of the arm has to be adjusted in accordance with the height of the moulds used to form the parisons and the height of both arms must be equal. The present procedure is to position a feeler gauge on top of the mould, the gauge being set to having a thickness equal to the required height which the neck ring halves should reach above the mould, the arm is then mounted on the carrier by fitting the T-shaped projection thereof into the slot in the arm, the arm is moved downwards with the projection sliding along the slot until the arm contacts the gauge, the arm is then tapped with a hammer into intimate engagement with the gauge, the arm is then clamped against movement on the carrier by means of a clamping screw mounted on the carrier and operable to engage the arm and force it away from the carrier so that the T-shaped projection and edge portions of the slot come into firm engagement, and the gauge is then removed. This is a time-consuming operation which has to be carried out on the machine whenever the arms are replaced whether because of wear or for a job change and causes considerable down-time for the machine.

It is an object of the present invention to provide a parison transferring mechanism in which the arms can be mounted on the carriers more rapidly than in the procedure mentioned above.

BRIEF SUMMARY OF THE INVENTION

The invention provides a parison transferring mechanism for a glassware manufacturing machine comprising two neck ring carriers each of which provides a mounting for an arm which supports a neck ring half, the carriers being movable towards one another to bring the neck ring halves into parison-gripping engagement or apart to separate the neck ring halves to release a parison, the carriers also being turnable back and forth about a common horizontal axis to move the neck ring halves between a parison-gripping position and a parison-releasing position, the mounting for each arm being arranged so that the arm projects away from the carrier, in a plane normal to the horizontal axis, and when the carrier is turned into an orientation such that the arm projects horizontally, the height of the arm relative to the axis can be adjusted, wherein each carrier has a stop mounted thereon such that, when the carrier is in said orientation, the stop is at a predetermined height relative to the axis, the stop being arranged to engage a stop on the arm to determine the height of the arm relative to the axis, the stop on the arm being adjustable heightwise to vary the height at which the arm projects.

With a parison transferring mechanism according to the last preceding paragraph, the stop on the arm can be adjusted away from the machine in relation to the predetermined height of the stop of carrier. This adjustment can be carried out using a mould and a feeler gauge as described above, the mould being either that which is to be mounted in the machine or one identical to that already mounted therein. The arm can then be mounted on the carrier, coming automatically to the required height when the stops engage, and be clamped to the carrier. If the predetermined height is the same for the carriers of all the sections of a machine, the adjustable stops of all the arms of the machine can be adjusted to the same height and the arms are then interchangeable.

The stop on the carrier may have its stop surface machined to the predetermined height or it may be mounted for adjustment to the pedetermined height. For example, the stop may be mounted on an eccentric pin for adjustment to the predetermined height and to be locked at the predetermined height. The predetermined height may be altered, if desired, by providing alternative fixing points for the stop on the carrier.

Conveniently, the stop on the arm is mounted on an elongated slot of the arm so that it is easily adjustable to any height along the slot. Alternatively, the stop may be adjustable by a screw arrangement. A scale may be provided on the arm to assist adjustment of the stop.

The invention also provides a method of mounting arms which support neck ring halves on the neck ring carriers of a parison transferring mechanism of a glassware forming machine which comprises two neck ring carriers each of which provides a mounting for one of the arms, the carriers being movable towards one another to bring the neck ring halves into parison-gripping engagement or apart to separate the neck ring halves to release a parison, the carriers also being turnable back and forth about a common horizontal axis to move the neck ring halves between a parison-gripping position and a parison-releasing position, the method comprising adjusting stops on the arms to a height determined in relation to a predetermined height of stops on the carriers, inserting the arms into mountings of the carrier until the stop of each arm engages the stop on the carrier, and clamping the arms against movement relative to the carriers.

BRIEF DESCRIPTION OF THE DRAWINGS

There now follows a detailed description, to be read with reference to the accompanying drawings, of a parison transferring mechanism which is illustrative of the invention and of a method of mounting an arm on a neck ring carrier of the illustrative parison transferring mechanism which is illustrative of the invention in its method aspects. It is to be understood that the illustrative parison transferring mechanism and illustrative method have been selected for description by way of example and not of limitation of the invention.

In the drawings.

DETAILED DESCRIPTION OF PREFERRED EMBODIMENT OF THE INVENTION

Figure 1:
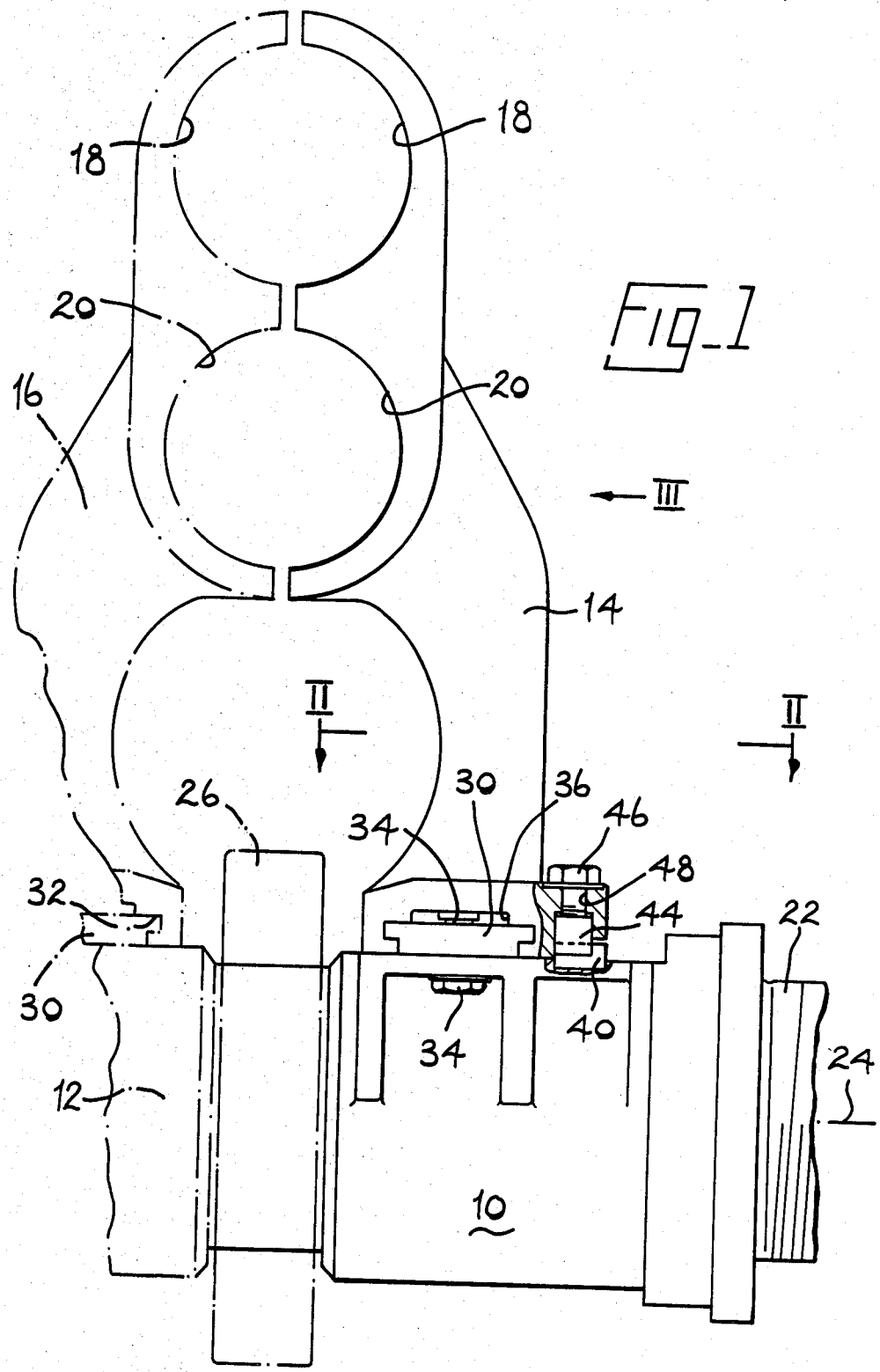
FIG. 1 is a partial plan view of the illustrative parison transferring means.
Figure 2:
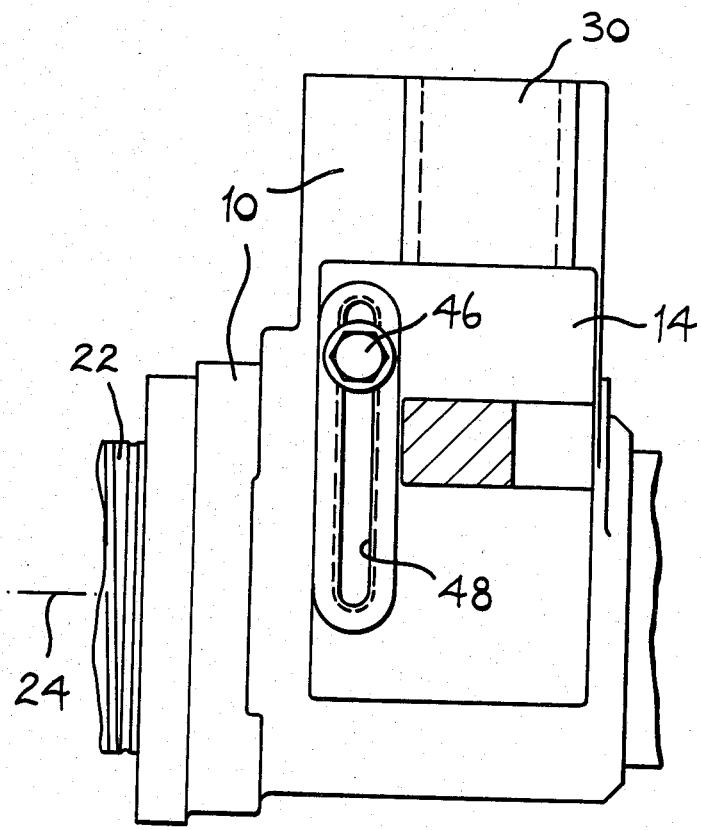
FIG. 2 is a sectional view taken on the line II—II in FIG. 1.

The illustrative parison transferring mechanism is for a glassware manufacturing machine of the individual section type. The mechanism comprises two neck ring carriers 10 and 12 which are similar in construction (the carrier 12 being a mirror-image of the carrier 10) so that it is only necessary to describe the carrier 10 in detail. Each carrier 10 and 12 provides a mounting for an arm 14 and 16 respectively which supports a neck ring half 18 and a further neck ring half 20. The neck ring halves 18 are arranged facing one another so that they can grip a neck portion of a parison, the neck ring halves 20 also beng arranged facing one another so that they can grip a neck portion of a further parison. The carriers 10 and 12 are mounted on a horizontal shaft 22 and can slide along the shaft so that they are movable towards one another to bring the neck ring halves 18 and 20 into parison-gripping engagement or apart to separate the neck ring halves 18 and 20 to release a parison. The shaft 22 is mounted to turn about a longitudinal axis 24 thereof when a gear 26 secured thereto is turned. The carriers 10 and 12 turn with the shaft 22 so that the carriers are turnable back and forth about a common horizontal axis, which is the axis 24, when the shaft 22 is turned back and forth. A turning movement of approximately 180° about the axis 24 moves the neck ring halves 18 and 20 between a parison-gripping position at a parison forming station of the machine and a parison-releasing position at a finishing station of the machine. The mounting of the carriers 10 and 12 on the shaft 22 and the means for moving the carriers along the shaft and the means for turning the shaft are of conventional construction and accordingly will not be described further herein.

The mounting for each arm 14 or 16 comprises two aligned T-shaped projections 30 on the carrier 10 or 12. The arm 14 or 16 has a slot 32 therein of complementary shape to the projection 30 so that the arm can be mounted on the carrier with the projections 30 received in the slot 32. The slot 32 has open ends so that the arm 14 or 16 can slide relative to the carrier 10 or 12 with the projections 30 moving along the slot 32. When the projections 30, are received in the slot 32, the arm 14 or 16 projects away from the carrier 10 or 12 in a plane normal to the horizontal axis 24 and, when the carrier is turned into an orientation such that the arm 14 or 16 projects horizontally, as it does at the parison-gripping and parison-releasing positions, the height of the arm 14 or 16 relative to the axis 24 can be adjusted by sliding the arm past the projection 30. Once the height has been adjusted, the arm 14 or 16 is clamped against further movement relative to the carrier 10 or 12 by means of a clamping screw 34 which is threadedly-received in a bore in the carrier 10 or 12 and bears on the arm 14 or 16 in a recess 36 in the slot 32. This arrangement for mounting and clamping the arm 14 or 16 is also conventional.

Figure 3:
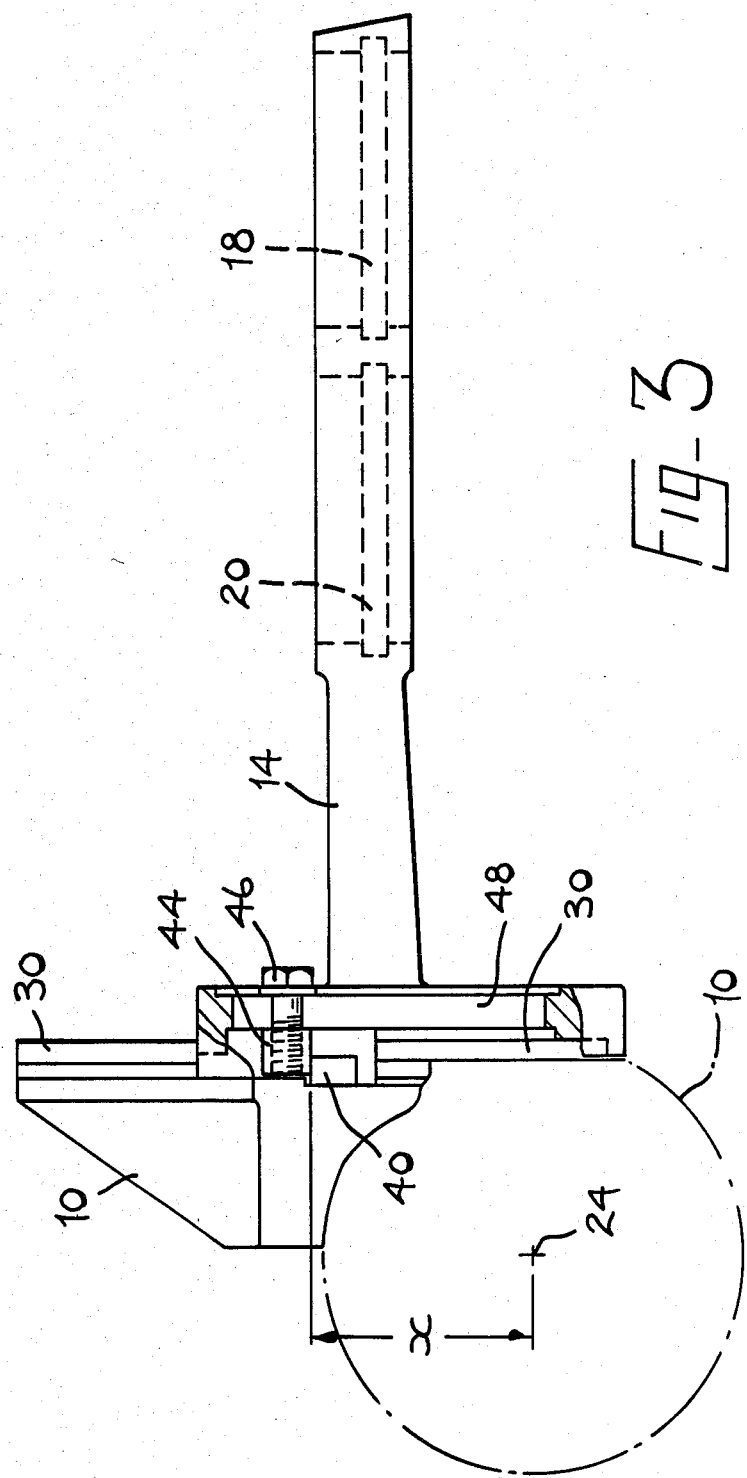
FIG. 3 is a view taken in the direction of the arrow III in FIG. 1.

Each carrier 10 and 12 has a stop 40 (see FIG. 3) mounted thereon. The stop 40 is mounted so that it is at a predetermined height, indicated by x in FIG. 3, relative to the axis 24. The height x is the same for the stops 40 of both carriers 10 and 12, this being achieved by machining the upper surfaces of the stops 40 to this height.

A stop 44 (see FIG. 3) is mounted on each arm 14 or 16 on a bolt 46 which is threadedly-received into the stop 44. The bolt 46 is slidable along an elongated slot 48 which extends parallel to the slot 32. The stop 44 can be moved along the slot 48 to a required height and then fixed relative to the arm by tightening the bolt 46. The stop 40 on the carrier is arranged to engage the stop 44 as the arm 14 or 16 slides relative to the carrier 10 or 12 with the projections 30 in the slot 32. When the stops 40 and 44 come into engagement, the clamping screw 34 is tightened. Thus, the height of the arm 14 or 16 relative to the axis 24 is determined by the height of the stop 44 on the arm and the stop 44 is adjustable heightwise to vary the height at which the arm projects.

The illustrative parison transferring mechanism is used in the illustrative method of mounting arms which support neck ring halves on the neck ring carriers. In the method, the stops 44 are adjusted on the arms 14 and 16 to a height determined in relation to the height x of the stop 40 on the carrier 10 or 12. This is done away from the machine on a bench using a support for the arm which is adjusted to the height x, a mould to be used in the machine, an identical mould or a blank of the same height as such a mould, and a feeler gauge set to a thickness equal to a required clearance between the neck ring halves 18 and 20 and the mould. Once the stops 44 have been adjusted, the arms are inserted into the mountings of the carrier with the projections 30 sliding along the slots 32 until the stops 40 engage the stops 44. The arms are then at the required height and the clamping screws are tightened.

As, in the illustrative method, the adjustment of the stops 44 is carried out away from the machine, the actual down-time of the machine caused when changing the arms is considerably reduced by comparison with conventional methods.

I claim:

1. A parison transferring mechanism for a glassware manufacturing machine comprising two neck ring carriers each of which provides a mounting for an arm which supports a neck ring half, the carriers being movable towards one another to bring the neck ring halves into parison-gripping engagement or apart to separate the neck ring halves to release a parison, the carriers also being turnable back and forth about a common horizontal axis to move the neck ring halves between a parison-gripping position and a parison-releasing position, the mounting for each arm being arranged so that the arm projects away from the carrier, in a plane normal to the horizontal axis, and when the carrier is turned into an orientation such that the arm projects horizontally, the height of the arm relative to the axis can be adjusted, the mechanism including a stop on each carrier such that, when the carrier is in said orientation, the stop is at a predetermined height relative to the axis, a stop on each arm engaging said stop on said carrier when said arm is mounted on said carrier to determine the height of the arm relative to the axis, and means for adjusting the stop on the arm heightwise to vary the height at which the arm horizontally projects from said carrier with respect to said axis.

2. A parison transferring mechanism according to claim 1, wherein the stop on the carrier is mounted for adjustment to the predetermined height.

3. A parison transferring mechanism according to claim 1, wherein the stop on the arm is mounted in an elongated slot of the arm.

4. A parison transferring mechanism according to claim 2, wherein the stop on the arm is mounted in an elongated slot of the arm.

5. A method of mounting arms which support neck ring halves on the neck ring carriers of a parison transferring mechanism of a glassware forming machine which comprises two neck ring carriers each of which provides a mounting for one of the arms, the carriers being movable towards one another to bring the neck ring halves into parison-gripping engagement or apart to separate the neck ring halves to release a parison, the carriers also being turnable back and forth about a common horizontal axis to move the neck ring halves between a parison-gripping position and a parison-releasing position, wherein the method comprises adjusting stops on the arms when said arms are removed from said carriers to a height determined in relation to a predetermined height of stops on the carriers, inserting the arms into mountings of the carrier until the stop of each arm engages the stop on the carrier, and clamping the arms against movement relative to the carriers.

6. A parison transferring mechanism according to claim 1 further including clamping means for clamping said arms to said carriers.

* * * * *